United States Patent [19]

Kaneko

[11] Patent Number: 5,619,938
[45] Date of Patent: Apr. 15, 1997

[54] METHOD OF INCINERATING WASTE MATERIAL BY WAY OF DRY DISTILLATION AND GASIFICATION

[75] Inventor: Masamoto Kaneko, Takasaki, Japan

[73] Assignee: Kinsei Sangyo Co., Ltd., Takasaki, Japan

[21] Appl. No.: 532,523

[22] Filed: Sep. 22, 1995

[30] Foreign Application Priority Data

Sep. 22, 1994 [JP] Japan .................................. 6-228044

[51] Int. Cl.$^6$ ................................... F23G 5/12
[52] U.S. Cl. ............................ 110/346; 110/229; 110/190
[58] Field of Search ...................... 110/188, 190, 110/211, 212, 229, 235, 345, 346; 48/111

[56] References Cited

U.S. PATENT DOCUMENTS

| | | | |
|---|---|---|---|
| 5,101,739 | 4/1992 | Nance et al. | 110/229 |
| 5,159,899 | 11/1992 | Dobrzynski | 110/229 |
| 5,213,051 | 5/1993 | Kaneko | 110/229 |
| 5,445,087 | 8/1995 | Kaneko | 110/190 |
| 5,477,790 | 12/1995 | Foldyna et al. | 110/346 |

*Primary Examiner*—John T. Kwon
*Attorney, Agent, or Firm*—Paul A. Guss

[57] ABSTRACT

A waste material in a first gasification furnace is thermally decomposed through dry distillation, producing a combustible gas, which is introduced into and combusted in a first combustion furnace, and the produced heat of combustion is imparted to a heat source of a boiler. The opening of a valve connected to the first gasification furnace is controlled to supply oxygen required to thermally decompose the waste material in order to keep the combustion temperature of the combustible gas in the first combustion furnace at a substantially constant combustion temperature upon the dry distillation in the first gasification furnace. When the opening of the valve increases and becomes greater than a predetermined opening at an ending stage of the dry distillation in the first gasification furnace, a waste material in a second gasification furnace is thermally decomposed through dry distillation, producing a combustible gas. The combustible gas is introduced into and combusted in a second combustion furnace, and the produced heat of combustion is imparted to the heat source of the boiler. The opening of a valve connected to the second gasification furnace is controlled to supply of oxygen required to thermally decompose the waste material in order to keep the combustion temperature of the combustible gas in the second combustion furnace at the substantially constant combustion temperature upon the dry distillation in the second gasification furnace.

8 Claims, 3 Drawing Sheets

METHOD OF INCINERATING WASTE MATERIAL BY WAY OF DRY DISTILLATION AND GASIFICATION

BACKGROUND OF THE INVENTION

1. Field of the Invention

The present invention relates to a method of incinerating waste materials such as waste tires, for example, through dry distillation and gasification by thermally decomposing and gasifying a waste material by way of dry distillation to produce a combustible gas, burning the combustible gas, and imparting the heat of combustion to a heat source such as a boiler or the like.

2. Description of the Prior Art

One known process of incinerating waste materials such as waste tires, for example, is disclosed in Japanese laid-open patent publication No. 5-296427. According to the disclosed process, a waste material is placed in a fully closed gasification furnace and a portion of the waste material is burned while the remainder of the waste material is thermally decomposed through dry distillation with the heat of combustion. A combustible gas produced by the waste material when it is thermally decomposed is introduced from the gasification furnace into a combustion furnace positioned outside of the gasification furnace, and the introduced combustible gas is burned in the combustion furnace.

During the above incinerating process, the gasification furnace is supplied with oxygen (air) necessary to carry out the dry distillation through an oxygen supply passage, and the temperature at which the combustible gas is burned in the combustion furnace is detected. The opening of a valve disposed in the oxygen supply passage is controlled depending on the detected temperature through a feedback loop so that the detected temperature will be equalized to a certain substantially constant temperature.

In the incinerating process, the temperature at which the combustible gas is burned in the combustion furnace, i.e., the combustion temperature of the combustible gas, varies as indicated by the solid-line curve a in FIG. 2 of the accompanying drawings. Specifically, after a portion of the waste material in the gasification furnace has been ignited, starting dry distillation, the combustion temperature of the combustible gas in the combustion furnace gradually increases as the amount of a generated combustible gas gradually increases. When the combustion temperature of the combustible gas reaches a predetermined temperature, the opening of the valve in the oxygen supply passage is controlled to keep the combustion temperature continuously at the predetermined temperature. When the remainder of the waste material which can be thermally decomposed is reduced in amount as the dry distillation is in progress, since the amount of a generated combustible gas is reduced even though the opening of the valve is controlled, the combustion temperature of the combustible gas in the combustion furnace gradually decreases from the predetermined temperature.

According to the above incinerating process, the waste material can be incinerated in a manner to prevent gases such as NOx, etc. which are harmful to environments from being emitted when the predetermined temperature is set to a suitable temperature. Furthermore, the heat of combustion of the combustible gas can effectively be utilized when it is imparted to a heat source of an apparatus which utilizes heat energy, such as a boiler or the like. The apparatus such as a boiler or the like can be operated efficiently during a period of time in which the combustion temperature of the combustible gas is maintained at the substantially constant temperature.

It is desirable to process a large amount of waste material efficiently in the incinerating process. If the heat of combustion of the combustible gas in the combustion furnace is utilized as the heat source of the apparatus such as a boiler or the like, it is also preferable to be able to operate the apparatus efficiently over a continuous period of time. These demands may be met by increasing the capacity of the gasification and combustion furnaces for processing a large amount of waste material. However, a large amount of waste material placed in the gasification furnace generally prevents the heat from being smoothly propagated for dry distillation, making it difficult to thermally decompose the waste material stably and sufficiently through dry distillation. When this happens, the amount of a generated combustible gas is unstable, and the combustion temperature of the combustible gas in the combustion furnace is also unstable, tending to generate undesirable gases such as NOx, etc. and failing to stably operate the apparatus such as a boiler or the like efficiently.

In view of the above problems, the inventor attempted to provide two or more sets of gasification and combustion furnaces, and thermally decompose a waste material through dry distillation and burn a produced combustible gas successively or alternately at suitable times in the gasification and combustion furnaces of the sets, for thereby processing a large amount of waste material and imparting the heat of combustion of the combustible gas successively or alternately from the combustion furnaces to the heat source of an apparatus such as a boiler or the like, so that the apparatus can operate continuously over a long period of time.

More specifically, if there are two sets of gasification and combustion furnaces available, then a waste material is thermally decomposed through dry distillation and a generated combustible gas is burned in one of the two sets of gasification and combustion furnaces, and the heat of combustion of the combustible gas is imparted to the heat source of an apparatus such as a boiler or the like. When the dry distillation of the waste material in the gasification furnace is finished, a waste material starts being thermally decomposed through dry distillation and a generated combustible gas starts being burned in the other set of gasification and combustion furnaces, and the heat of combustion of the combustible gas is imparted to the heat source of the apparatus such as a boiler or the like.

The above combination of the sets of gasification and combustion furnaces makes it possible to process a larger amount of waste material and increase the period during which the head of combustion is imparted to the apparatus such as a boiler or the like, resulting in an increased period of time during which the apparatus can operate continuously.

When the waste material is incinerated and the apparatus such as a boiler or the like is operated using the two sets of gasification and combustion furnaces, the other next set of gasification and combustion furnaces should preferably begin to operate with such timing that when the combustion temperature (see the solid-line curve a in FIG. 2) of the combustible as produced by the operation of the first set of gasification and combustion furnaces starts being lowered from the predetermined temperature, the combustion temperature of the combustible gas produced by the operation of the next set of gasification and combustion furnaces rises to the predetermined temperature as indicated by the broken-line curve $a_2$ in FIG. 2. With such starting of operation of the next or subsequent set of gasification and combustion furnaces, the temperature of the heat of combustion imparted to the apparatus such as a boiler or the like is kept at the predetermined temperature after the combustion temperature of the combustible gas in the combustion furnace of the prior set has reached the predetermined temperature until the combustion temperature of the combustible gas in the combustion furnace of the subsequent set begins to drop from the predetermined temperature. During this time, the amount of thermal energy applied to the apparatus such as a boiler or the like per unit time is kept substantially constant, so that the apparatus can stably be operated efficiently over a prolonged period of time.

If the time to operate the subsequent set of gasification and combustion furnaces is delayed from the above timing, i.e., if the combustion temperature of the combustible gas in the combustion furnace of the subsequent set reaches the predetermined temperature, as indicated by the imaginary-line curve $a_x$ in FIG. 2, after the combustion temperature of the combustible gas in the combustion furnace of the prior set has dropped a certain level from the predetermined temperature, then since the temperature of the heat of combustion imparted to the apparatus such as a boiler or the like temporarily falls greatly, the apparatus tends to operate unstably. If, on the other hand, the combustion temperature of the combustible gas in the combustion furnace of the subsequent set reaches the predetermined temperature, as indicated by the imaginary-line curve $a_y$ in FIG. 2, while the combustion temperature of the combustible gas in the combustion furnace of the prior set is being still maintained at the predetermined temperature, i.e., if the periods in which the combustion temperatures of the combustible gas in the combustion furnaces of the prior and subsequent sets are maintained at the predetermined temperature overlap each other, then the temperature of the heat of combustion imparted to the apparatus such as a boiler or the like is maintained, but the amount of thermal energy imparted to the apparatus per unit time is excessively large in the overlapping periods, with the result that the apparatus tends to operate unstably. In this case, the period of time in which the required heat of combustion is continuously imparted to the apparatus such as a boiler or the like is shorter than if the gasification and combustion furnaces of the subsequent set start to operate with appropriate timing as described above.

The inventor predicted that if the amount of a waste material accommodated in the gasification furnace (which corresponds to the capacity of the gasification furnace) remains the same, then the period of time (hereinafter referred to as a "temperature-constant time") in which the combustion temperature of the combustible gas is maintained at the predetermined temperature is substantially constant, and the period of time (hereinafter referred to as a "temperature-rising time") in which the combustion temperature of the combustible gas rises to the predetermined temperature after the gasification and combustion furnaces have started to operate is also substantially constant, and estimated and established a temperature-constant time and a temperature -rising time based on the above presumption. The inventor also attempted to start operating the gasification and combustion furnaces of the subsequent set upon elapse of a time that is calculated by subtracting the temperature-rising time from the temperature-constant time which has started from the time when the combustion temperature of the combustible gas in the combustion furnace of the prior set reached the predetermined temperature.

As a result of various research efforts, the inventor has found out that while the temperature-rising time is not largely affected by the manner in which the waste material is stored in the gasification furnace, the tempera- ture-constant time may not necessary remain constant even if the amount of waste material stored in the gasification furnace is the same, and is likely to vary relatively greatly depending on the manner in which the waste material is stored in the gasification furnace. Therefore, even if the gasification and combustion furnaces of the subsequent set start operating based on the temperature-constant time and the temperature-rising time as described above, the gasification and combustion furnaces may start operating too late or too early with respect to the appropriate timing. Consequently, it has been difficult to operate the gasification and combustion furnaces of the subsequent set reliably with suitable timing.

SUMMARY OF THE INVENTION

It is therefore an object of the present invention to provide a method of incinerating waste materials through dry distillation and gasification by operating at least two sets of gasification and combustion furnaces reliably with appropriate timing for thereby operating an apparatus such as a boiler or the like stably and efficiently over a long period of time when the gasification and combustion furnaces of the at least two sets are operated successively or alternately, and the heat of combustion of combustion gases generated by the combustion furnaces is imparted continuously to a heat source of the apparatus such as a boiler or the like.

As a result of various research activities, the inventor has made the following findings: When the opening of a valve disposed in an oxygen supply passage connected to a gasification furnace is controlled so as to keep the combustion temperature of a combustible gas in a combustion furnace at a constant temperature, the amount of the combustible gas is reduced at an ending stage of drying distillation of a waste material in the gasification furnace, and hence the opening of the valve is increased to increase the amount of the combustible gas that is produced. In a stage where the opening of the valve increases, the period of time spent after the opening of the valve has increased to a predetermined opening until the combustion temperature of the combustible gas in the combustion furnace starts to drop is substantially constant regardless of the manner in which the waste material is stored in the gasification furnace. Therefore, in an interval in which the opening of the valve disposed in the oxygen supply passage connected to the gasification furnace is large in the ending stage of drying distillation of the waste material in the gasification furnace, the period of time after a certain time in the interval until the combustion temperature of the combustible gas in the combustion furnace starts to drop corresponds to the opening of the valve at the certain time. Consequently, in the case where two sets or combinations of gasification and combustion furnaces are successively to be operated, if the gasification and combustion furnaces of the subsequent set start to operate depending on the opening of the valve in the oxygen supply passage connected to the gasification furnace of the prior set, and also if the opening of the valve which starts to operate the gasification and combustion furnaces of the subsequent set is set to an appropriate opening, then it is possible to substantially equalize the period of time after gasification and combustion furnaces of the subsequent set have started to operate until the combustion temperature of the combustible gas in the combustion furnace of the prior set starts to drop to the period of time required until the combustion temperature of the combustible gas in the combustion furnace of the subsequent set rises to a predetermined temperature.

To achieve the above object, there is provided in accordance with the present invention a method of incinerating a waste material through dry distillation and gasification, comprising the steps of (a) thermally decomposing a waste material stored in a first gasification furnace through dry distillation, (b) introducing a combustible gas produced in the first gasification furnace by the dry distillation into a first combustion furnace, combusting the combustible gas in the first combustion furnace, and imparting the heat of combustion to a heat source of an object to be heated, (c) controlling the opening of a valve disposed in an oxygen supply passage connected to the first gasification furnace to supply an amount of oxygen required to thermally decompose the waste material in the first gasification furnace through dry distillation in order to keep the combustion temperature of the combustible gas in the first combustion furnace at a substantially constant combustion temperature upon the dry distillation of the waste material in the first gasification furnace, (d) starting to thermally decompose a waste material stored in a second gasification furnace through dry distillation when the opening of the valve disposed in the oxygen supply passage connected to the first gasification furnace increases and becomes greater than a predetermined opening at an ending stage of the dry distillation of the waste material in the first gasification furnace, (e) introducing a combustible gas produced in the second gasification furnace by the dry distillation into a second combustion furnace, combusting the combustible gas in the second combustion furnace, and imparting the heat of combustion to the heat source of the object to be heated, and (f) controlling the opening of a valve disposed in an oxygen supply passage connected to the second gasification furnace to supply an amount of oxygen required to thermally decompose the waste material in the second gasification furnace through dry distillation in order to keep the combustion temperature of the combustible gas in the second combustion furnace at the substantially constant combustion temperature upon the dry distillation of the waste material in the second gasification furnace.

Each of the steps (a) and (d) comprises the steps of igniting and burning a portion of the waste material, and thermally decomposing the remainder of the waste material with the heat of combustion of the portion of the waste material.

Each of the steps (c) and (f) comprises the steps of reducing the opening of the valve when the combustion temperature of the combustible gas in the combustion furnace is higher than a given temperature preset as the substantially constant combustion temperature, and increasing the opening of the valve when the combustion temperature of the combustible gas in the combustion furnace is lower than the given temperature.

Each of the steps (b) and (e) comprises the step of mixing the combustible gas introduced from the gasification furnace into the combustion furnace with oxygen required to combust the combustible gas to combust the combustible gas in the combustion furnace.

The opening of the valve disposed in the oxygen supply passage connected to the first gasification furnace at the time of starting to thermally decompose the waste material stored in the second gasification furnace through dry distillation in the step (d) is determined such that a period of time spent after the opening of the valve disposed in the oxygen supply passage connected to the first gasification furnace has increased to the predetermined opening until the combustion temperature of the combustible gas in the first combustion furnace starts to drop from the substantially constant combustion temperature is substantially equal to a period of time spent after the dry distillation of the waste material stored in the second gasification furnace has been started until the combustion temperature of the combustible gas in the second combustion furnace increases to the substantially constant combustion temperature.

With the arrangement of the present invention, when the opening of the valve disposed in the oxygen supply passage connected to the first gasification furnace increases and is greater than the predetermined opening at the ending stage of the dry distillation of the waste material in the first gasification furnace, the dry distillation of the waste material stored in the second gasification furnace is started. By setting the predetermined opening for the valve to an appropriate value, it is possible to substantially equalize the period of time spent after the dry distillation of the waste material in the second gasification furnace has started until the combustion temperature of the combustible gas in the first combustion furnace starts to drop from the substantially constant combustion temperature to the period of time required until the combustion temperature of the combustible gas in the second combustion furnace increases to the substantially constant combustion temperature, regardless of the manner in which the waste materials are stored in the first and second gasification furnaces. with the predetermined opening for the valve being thus set to an appropriate value, the heat of combustion at a substantially constant temperature can be imparted continuously from the first and second combustion furnaces to the heat source of the object to be heated, such as a boiler, and the quantity of heat imparted per unit time can be uniformized continuously upon a shift from the combustion of the combustible gas in the first combustion furnace to the combustion of the combustible gas in the second combustion furnace. Therefore, the sets of the gasification and combustion furnaces can be operated successively or alternately to impart the heat of combustion at a substantially constant temperature continuously to the heat source of the object to be heated over a long period of time, with the result that an apparatus such as a boiler or the like which is to be heated can be operated stably and efficiently over a long period of time.

Further according to the present invention, upon the dry distillation of the waste material in the second gasification furnace, the waste material ashed in the first gasification furnace is removed and then a waste material is newly stored in the first gasification furnace. At an ending stage of the dry distillation of the waste material in the second gasification furnace, the waste material newly stored in the first gasification furnace starts being thermally decomposed through dry distillation when the opening of the valve disposed in the oxygen supply passage connected to the second gasification furnace increases and becomes greater than a predetermined opening. Thereafter, the dry distillation of the waste materials in the first and second gasification furnaces is alternately repeated. When the set of the first gasification and combustion furnaces and the set of the second gasification and combustion furnaces are alternately operated repeatedly with the aforesaid timing, the period of time during which the apparatus such as a boiler or the like continuously operates stably and efficiently can be greatly increased, and a large amount of waste material can be incinerated using the two sets of gasification and combustion furnaces.

Moreover, when the opening of the valve disposed in the oxygen supply passage connected to one of the first and second gasification furnaces in which the waste material is thermally decomposed through dry distillation is greater than the predetermined opening continuously for a predetermined period of time, the waste material stored in the other of the first and second gasification furnaces starts being thermally decomposed through dry distillation. In this manner, even if the opening of the valve temporarily exceeds the predetermined opening prior to the ending stage of the dry distillation for some reason, such as a particular state in which the waste materials are stored in the gasification furnaces, the gasification and combustion furnaces of the subsequent set do not start to operate, but start to operate reliably with the foregoing timing.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

An incinerating apparatus for carrying out a method of incinerating a waste material through dry distillation and gasification according to the present invention will be described below with reference to FIGS. 1 through 3.

Figure 1:
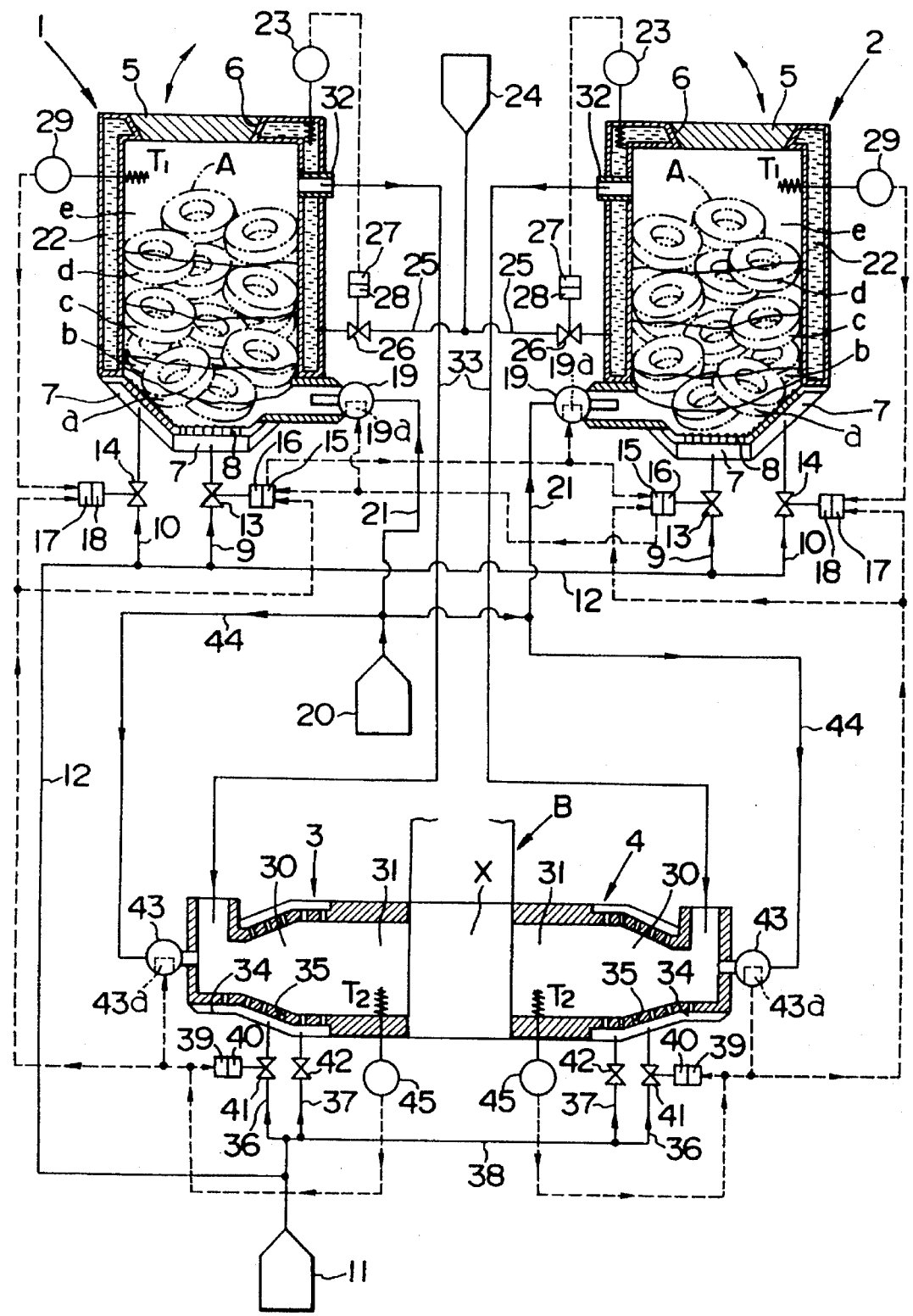
FIG. 1 is a schematic diagram of an incinerating apparatus for carrying out a method of incinerating a waste material through dry distillation and gasification according to the present invention.

As shown in FIG. 1, the incinerating apparatus has a pair of gasification furnaces 1, 2 accommodating waste materials A such as waste tires or the like therein, and a pair of combustion furnaces 3, 4 connected respectively to the gasification furnaces 1, 2. The gasification furnaces 1, 2 are identical in structure to each other, and the combustion furnaces 3, 4 are identical in structure to each other.

The gasification furnaces 1, 2 have respective charge inlets 6 defined in upper walls thereof and openable and closable by respective hinged doors 5. The waste materials A can be charged into the gasification furnaces 1, 2 through the charge inlets 6 as they are opened by the respective doors 5. When the charge inlets 6 are closed by the respective doors 5, the interior spaces of the gasification furnaces 1, 2 are virtually isolated from the ambient space.

The gasification furnaces 1, 2 have respective downwardly projecting frustoconical lower walls having respective empty chambers 7 defined in their outer surfaces and isolated from the interior spaces of the gasification furnaces 1, 2. The empty chambers 7 are held in communication with the interior spaces of the gasification furnaces 1, 2 through a plurality of air supply nozzles 8 defined in lower inner walls of the gasification furnaces 1, 2.

A main oxygen supply pipe (oxygen supply passage) 9 and an auxiliary oxygen supply pipe 10 are connected to the empty chamber 7 of each of the gasification furnaces 1, 2. The main oxygen supply pipes 9 and the auxiliary oxygen supply pipes 10 are connected to an oxygen supply source (air supply source) 11 comprising a fan or the like through a common gasification furnace oxygen supply pipe 12. The main oxygen supply pipes 9 have respective control valves 13, and the auxiliary oxygen supply pipes 10 have respective solenoid-operated shutoff valves 14. The opening of the control valves 13 can be controlled by respective valve actuators 16 which are controlled by respective valve controllers 15 each comprising an electronic circuit including a CPU, etc. The solenoid-operated shutoff valves 14 can be opened and closed by respective valve actuators 18 which are controlled by respective valve controllers 17.

The valve controllers 15 for the main oxygen supply pipes 9 detect the opening of the control valves 13 based on the extent to which the valve actuators 16 are operated. The valve controller 15 associated with the gasification furnace 1 outputs a start command signal to the valve controller 15 and a gasification furnace igniter 19 (described later on) which are associated with the gasification furnace 2, depending on the detected opening of the control valve 13. Similarly, the valve controller 15 associated with the gasification furnace 2 outputs a start command signal to the valve controller 15 and a gasification furnace igniter 19 (described later on) which are associated with the gasification furnace 1, depending on the detected opening of the control valve 13.

Gasification furnace igniters 19 which comprise ignition burners or the like for igniting the waste materials A stored in the gasification furnaces 1, 2 are mounted on lower side walls of the respective gasification furnaces 1, 2. The igniters 19 are connected through fuel supply pipes 21 to a fuel supply 20 of combustion assistant oil or the like. The igniters 19 burn the fuel supplied from the fuel supply 20 through the fuel supply pipes 21 to generate combustion flames directed into the gasification furnaces 1, 2. The igniters 19 have respective ignition controllers 19a for controlling the igniting operation of the igniters 19. The ignition controllers 19a are supplied with start command signals from the respective valve controllers 15.

The gasification furnaces 1, 2 have respective water jackets 22 defined in their surrounding walls for cooling the gasification furnaces 1, 2. The water jackets 22 are isolated from the interior spaces of the gasification furnaces 1, 2. Water level sensors 23 for detecting water levels in the respective water jackets 22 are mounted on the upper walls of the gasification furnaces 1, 2. The water jackets 22 are connected to a water supply device 24 through water supply pipes 25 which have respective shutoff valves 26 associated with the respective gasification furnaces 1, 2. The shutoff valves 26 can be opened and closed by respective valve actuators 28 that are controlled by respective valve controllers 27. The valve actuators 28 open or close the respective shutoff valves 26 depending on detected signals from the water level sensors 23 for supply water from the water supply device 24 to the water jackets 22 until the water in the water jackets 22 reach respective predetermined levels.

Temperature sensors 29 for detecting a temperature T in the gasification furnaces 1, 2 are mounted on upper portions of the surrounding walls of the respective gasification furnaces 1, 2. Detected signals from the temperature sensors 29 are supplied to the valve controllers 17 associated with the respective gasification furnaces 1, 2.

Each of the combustion furnaces 3, 4 comprises a burner section 30 for mixing a combustible gas produced upon dry distillation of the waste material A and oxygen (air) needed for complete combustion of the combustible gas, and a combusting section 31 for combusting the combustible gas which is mixed with oxygen. The combusting section 31 is held in communication with the burner section 30 at its distal end. The combusting sections 31 of the respective combustion furnaces 3, 4 are connected to a heat source X of a boiler B which is a common object to be heated by the combustion furnaces 3, 4.

Gas pipes 33 extending from respective joints 34 mounted in upper portions of the surrounding walls of the respective gasification furnaces 1, 2 and held in communication with the interior spaces of the respective gasification furnaces 1, 2 are connected to rear ends of the respective burner sections 30. The combustible gas produced when the waste material A is thermally decomposed by dry distillation in the gasification furnaces 1, 2 is introduced through the gas pipes 33 into the burner sections 30 of the combustion furnaces 3, 4.

In each of the combustion furnaces 3, 4, the burner section 30 has an empty chamber 34 defined in an outer surface thereof and isolated from the interior space of the burner section 30. The empty chamber 34 is held in communication with the interior space of the burner section 30 through a plurality of nozzle holes 35 defined in an inner circumferential wall of the burner section 30. A pair of oxygen supply pipes 36, 37 is connected to the empty chamber 34 and also connected to the oxygen supply source 11 through a combustion furnace oxygen supply pipe 38 branched from the common gasification furnace oxygen supply pipe 12. The oxygen supply pipe 36 has a control valve 41 whose opening can be controlled by a valve actuator 40 which is controlled by a valve controller 39. The oxygen supply pipe 37 has a shutoff valve 42 whose opening can manually be controlled.

In each of the combustion furnaces 3, 4, a combustion furnace igniter 43 for igniting the combustible gas introduced into the burner section 30 is mounted on the rear end of the burner section 30. The combustion furnace igniter 43, which comprises an ignition burner or the like as with the gasification furnace igniter 19, is connected through a supply pipe 44 to the fuel supply 20. The combustion furnace igniter 43 burns the fuel supplied from the fuel supply 20 to generate combustion flames directed into the burner section 30. The combustion furnace igniter 43 has an ignition controller 43a for controlling the igniting operation of the combustion furnace igniter 43.

Temperature sensors 45 for detecting a combustion temperature $T_2$ of a combustible gas are mounted on the respective combusting sections 31 of the combustion furnaces 3, 4. Detected signals from the temperature sensors 45 are supplied to the respective valve controllers 39 and the respective ignition controllers 43a of the associated combustion furnaces 3, 4, and also to the valve controllers 15, 17 of the gasification furnaces 1, 2 that are associated with the combustion furnaces 3, 4, respectively.

Operation of the incinerating apparatus of the above structure will be described below.

First, a waste material A in the gasification furnace 1 is incinerated by the combination of the gasification and combustion furnaces 1, 3.

After the waste material A has been accommodated in the gasification furnace 1 and the door 5 thereof has been closed, the gasification furnace igniter 19 of the gasification furnace 1 is operated, igniting a lower layer of the waste material A, which now starts to be burned partially. When the waste material A in the gasification furnace 1 starts being burned partially, the operation of the gasification furnace igniter 19 is stopped.

Prior to the ignition of the lower layer of the waste material A, the water jacket 22 of the gasification furnace 1 has been supplied with water from the water supply device 24 through the water supply pipe 25, and the igniter 43 of the combustion furnace 3 has been operated. The interior space of the gasification furnace 1 has been evacuated through the combustion furnace 3 by a suction fan (not shown) on the boiler B for introducing a generated combustible gas into the combustion furnace 3.

When the waste material A is ignited, the solenoid-operated shutoff valves 14 which is associated with the gasification furnace 1 and the control valve 41 and the shutoff valve 42 which are associated with the combustion furnace 3 are closed.

Figure 3:
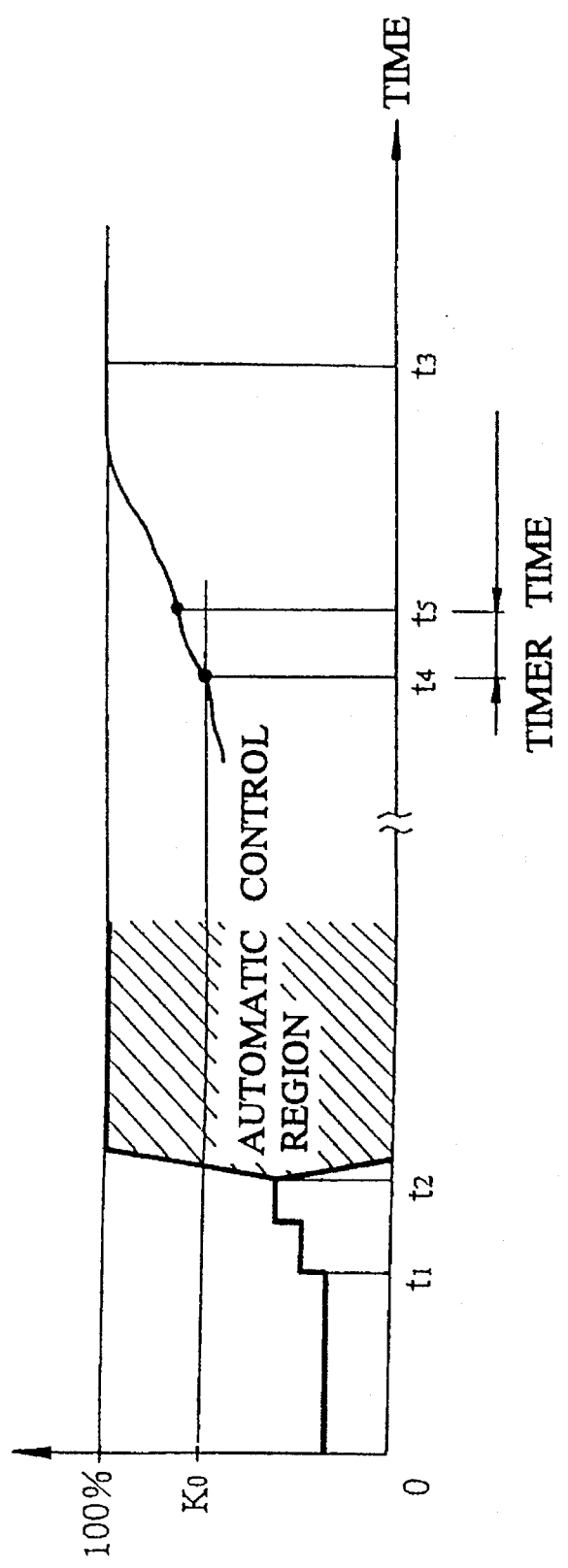
FIG. 3 is a diagram illustrative of the manner in which the incinerating apparatus shown in FIG. 1 operates.

For ignition of the waste material A, the control valve 13 associated with the gasification furnace 1 is opened to a relatively small degree as shown in FIG. 3 by the valve actuator 16 controlled by the valve controller 15, thereby supplying a relatively small amount of oxygen (air) from the oxygen supply source 11 through the gasification furnace oxygen supply pipe 12 and the main oxygen supply pipe 9 into the gasification furnace 1. Therefore, the waste material A in the gasification furnace 1 is ignited by the igniter 19 and then starts being partially burned on the oxygen that has been present in the gasification furnace 1 and the small amount of oxygen supplied from the oxygen supply source 11 through the main oxygen supply pipe 9. The amount of oxygen supplied from the oxygen supply source 11 to the gasification furnace 1 is limited by the control valve 13 to a small quantity just enough to ignite and partially burn the waste material A.

When the lower layer of the waste material A in the gasification furnace 1 starts being partially burned, the heat of combustion which is generated begins to thermally decompose an upper layer of the waste material A through dry distillation, generating a combustible gas from the thermally decomposed waste material A. The combustible gas generated in the gasification furnace 1 is introduced through the gas pipe 33 connected to the gasification furnace 1 into the burner section 30 of the combustion furnace 3. The combustible gas introduced into the burner section 30 is mixed with the air (oxygen) which exists in the combustion furnace 3, and is ignited by the combustion furnace igniter 43 and starts to be combusted in the combusting section 31 of the combustion furnace 3. The heat of combustion of the combustible gas in the combusting section 31 is imparted to the heat source X of the boiler B, starting to operate the boiler B.

The partial burning of the waste material A in the gasification furnace 1 is gradually stabilized while consuming the small amount of oxygen being supplied from the oxygen supply source 11, and the partially burned region is gradually spread in the lower layer of the waste material A at a rate that is made possible by the supply of oxygen from the oxygen supply source 11. As the burning of the lower layer of the waste material A is stabilized, the dry distillation of the upper layer of the waste material due to the heat of combustion of the lower layer is gradually activated, increasing the amount of a combustible gas generated by the thermally decomposed waste material A. The amount of a combustible gas that is introduced from the gasification furnace 1 into the combustion furnace 3 also increases, so that, as shown in FIG. 2, the combustion temperature $T_2$ in the combustion furnace 3 rises as indicated by the solidline curve $a_1$.

As the combustion temperature $T_2$ of the combustible gas in the combustion furnace 3 increases, the combustion temperature $T_2$ is detected by the temperature sensor 45 of the combustion furnace 3. When the detected combustion temperature $T_2$ reaches a preset combustion temperature $T_{2a}$, (see FIG. 2) at a time $t_1$, the valve controller 15 associated with the gasification furnace 1 controls the valve actuator 16 to open the control valve 13 to an opening which is slightly greater than the initial opening for a given period of time, and, after elapse of the given period of time, to a yet greater opening.

when the opening of the control valve 13 is thus increased stepwise, the amount of oxygen supplied from the oxygen supply source 11 to the gasification furnace 1 is increased stepwise while being limited to a quantity necessary to partially burn the lower layer of the waste material A continuously. Therefore, the burning of the lower layer of the waste material A in the gasification furnace 1 is gradually stabilized while consuming most of the oxygen supplied from the oxygen supply source 11, and the region in which the lower layer of the waste material A is burned is gradually spread at a rate made possible by the consumption of the supplied oxygen, but not higher than necessary. The dry distillation of the upper layer of the waste material A is stably in progress.

The combustion temperature $T_2$ of the combustible gas which is detected by the temperature sensor 45 of the combustion furnace 3 further increases. When the detected combustion temperature $T_2$ reaches a combustion temperature $T_{2c}$ (see FIG. 2) which is slightly lower than a preset substantially constant combustion temperature $T_{2b}$ at which the combustible gas undergoes spontaneous combustion and nitrogen oxides produced by the spontaneous combustion are of a small quantity ($T_{2a} < T_{2c} < T_{2b}$) at a time $t_2$, the valve controller 15 associated with the gasification furnace 1 actuates the valve actuator 16 to control the opening of the control valve 13 under automatic feedback control in order to keep the combustion temperature $T_2$ of the combustible gas which is detected by the temperature sensor 45 of the combustion furnace 3 at the preset combustion temperature $T_{2b}$.

Specifically, if the detected combustion temperature $T_2$ becomes lower than the combustion temperature $T_{2b}$, then the opening of the control valve 13 associated with the gasification furnace 1 is increased to increase the amount of oxygen supplied to the gasification furnace 1 for thereby accelerating the burning of the lower layer of the waste material A and promoting the dry distillation of the upper layer of the waste material A with the heat of combustion and also the generation of a combustible gas due to the dry distillation.

Conversely, if the detected combustion temperature $T_2$ becomes higher than the combustion temperature $T_{2b}$, then the opening of the control valve 13 associated with the gasification furnace 1 is reduced to reduce the amount of oxygen supplied to the gasification furnace 1 for thereby suppressing the burning of the lower layer of the waste material A and suppressing the dry distillation of the upper layer of the waste material A with the heat of combustion and also the generation of a combustible gas due to the dry distillation.

Figure 2:
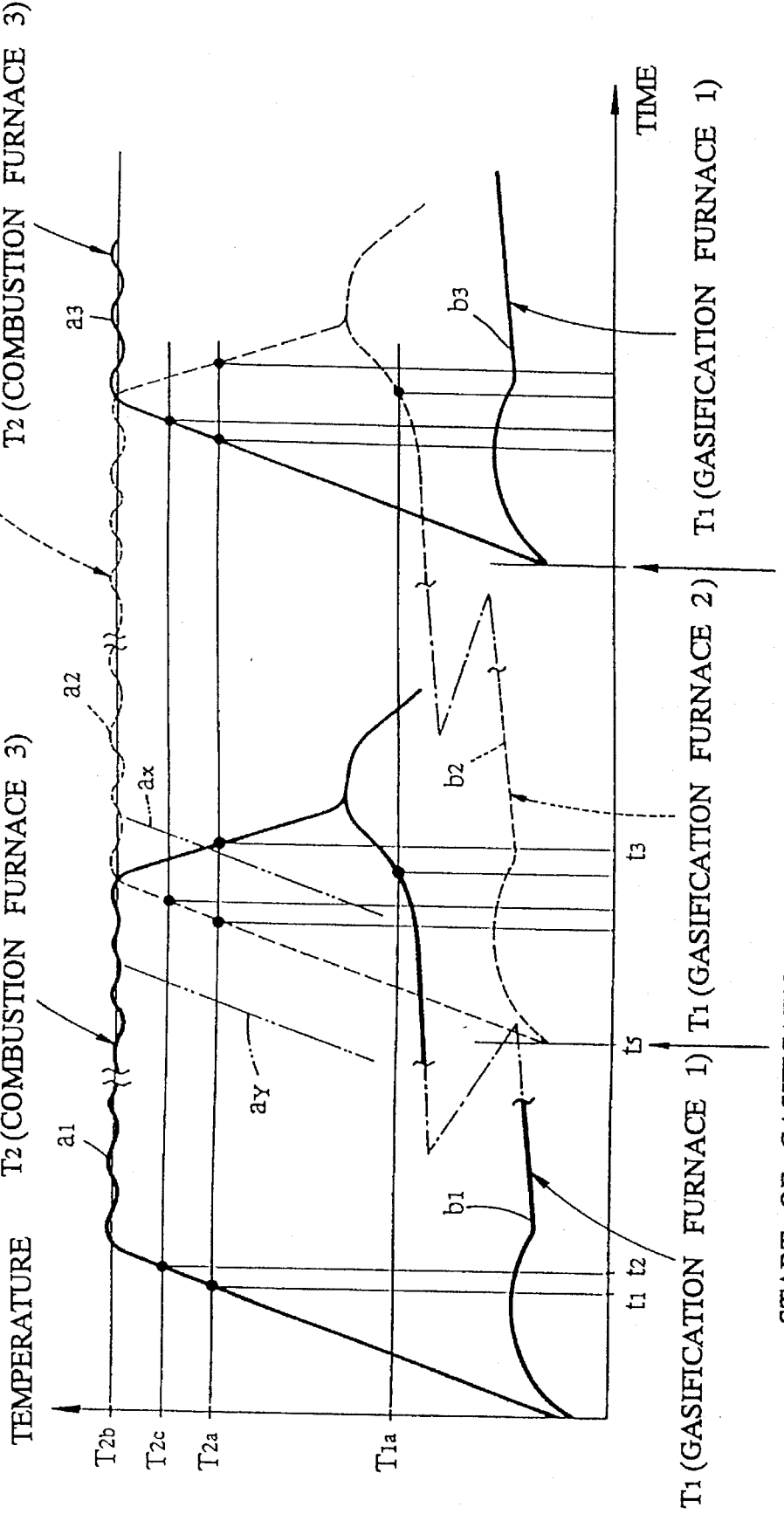
FIG. 2 is a diagram illustrative of the manner in which the incinerating apparatus shown in FIG. 1 operates.

The automatic feedback control of the opening of the control valve 13 associated with the gasification furnace 1 keeps the combustion temperature $T_2$ of the combustible gas in the combustion furnace 3 at the substantially constant combustion temperature $T_{2b}$, as indicated by the solid-line curve $a_1$ in FIG. 2. The burning of the lower layer of the waste material A and the dry distillation of the upper layer of the waste material A are now stably in progress under this condition.

The period of time spent after the dry distillation of the waste material A in the gasification furnace 1 has been started until the combustion temperature $T_2$ of the combustible gas in the combustion furnace 3 increases up to the combustion temperature $T_{2b}$ is substantially constant, not depending on the amount of the waste material A in the gasification furnace 1 and the manner in which the waste material A is stored in the gasification furnace 1. This holds true with respect to the combination of the gasification and combustion furnaces 2, 4 described later on.

When the combustion temperature $T_2$ of the combustible gas in the combustion furnace 3 is maintained at the substantially constant combustion temperature $T_{2b}$, the igniter 43 of the combustion furnace 3 is shut off by the ignition controller 43a. The combustible gas now undergoes spontaneous combustion continuously. The heat of combustion of the combustible gas is continuously imparted at the substantially constant combustion temperature $T_{2b}$ to the heat source X of the boiler B, which is allowed to operate stably efficiently.

While the burning of the lower layer of the waste material A and the dry distillation of the upper layer of the waste material A are stably in progress as described above, there are developed, in the interior space of the gasification furnace 1, an ashing layer "a", a red-hot layer "b", a fluidized layer "c", a heat transfer layer "d", and a gasifying layer "e", arranged successively from the bottom to the top of the gasification furnace 1, as shown in FIG. 1. Of these layers "a"–"e", the ashing layer "a" developed upon completion of combustion of the waste material A spreads upwardly, and the red-hot layer "b" where the waste material A is burned is progressively shifted upwardly.

During the dry distillation of the waste material A in the gasification furnace 1, the temperature $T_1$ in the gasification furnace 1 is detected by the temperature sensor 29 of the gasification furnace 1. The detected temperature $T_1$ varies as indicated by the solid-line curve $b_1$ in FIG. 2. Specifically, in an initial stage of the dry distillation of the waste material A, the temperature $T_1$ in the gasification furnace 1 increases after the lower layer of the waste material A has started to be burned, and thereafter drops because the heat of combustion is absorbed by dry distillation of the upper layer of the waste material A. When the dry distillation of the waste material A is stably in progress, the temperature $T_1$ in the gasification furnace 1 decreases as the burning of the lower layer of the waste material A goes on.

For combustion of the combustible gas in the combustion furnace 3, oxygen required to combust the combustible gas is supplied from the oxygen supply source 11 through the oxygen supply pipes 38, 36 to the combustion furnace 3.

More specifically, the valve controller 39 associated with the combustion furnace 3 operates the valve actuator 40 to open the control valve 41 in the oxygen supply pipe 36 to a suitable opening depending on the combustion temperature $T_2$ of the combustible gas detected by the temperature sensor 45, thus supplying oxygen from the oxygen supply source 11 through the oxygen supply pipes 38, 36, the empty chamber 34 of the combustion furnace 3, and the nozzle holes 35 into the burner section 30 of the combustion furnace 3, in which the combustible gas introduced from the gasification furnace 1 into the combustion furnace 3 and an amount of oxygen required to effect complete combustion of the combustible gas are mixed with each other. During the initial stage of the dry distillation of the waste material A in the gasification furnace 1, the valve controller 39 associated with the combustion furnace 3 increases the opening of the control valve 41 to increase the amount of oxygen supplied to the combustion furnace 3 as the amount of the combustible gas introduced into the combustion furnace 3 increases and the combustion temperature $T_2$ of the combustible gas rises. Then, when the dry distillation of the waste material A progresses stably and the combustion temperature $T_2$ of the combustible gas in the combustion furnace 3 is kept substantially constant, the valve controller 39 associated with the combustion furnace 3 varies the opening of the control valve 41 as the combustion temperature $T_2$ of the combustible gas varies slightly, thereby supplying an amount of oxygen sufficient to completely combust the combustible gas introduced into the combustion furnace 3 to the combustion furnace 3.

In supplying the oxygen to the combustion furnace 3, the operator may manually operate the shutoff valve 42 to adjust the amount of oxygen supplied to the combustion furnace 3 while confirming the state of combustion of the combustible gas.

When the dry distillation of the waste material A in the gasification furnace 1 is in progress, the ashing layer "a" in the lower portion of the gasification furnace 1 spreads, and the red-hot layer "b" where the waste material A is burned is gradually shifted upwardly from the lower layer toward the upper layer of the waste material A. Therefore, the fluidized layer "c" where the waste material A is subjected to dry distillation, the heat transfer layer "d", and the gasifying layer "e" are reduced, i.e., the amount of waste material A which can be thermally decomposed through dry distillation is reduced, as the ashing layer "a" spreads and the red-hot layer "b" is shifted upwardly.

As the amount of waste material A which can be thermally decomposed through dry distillation is reduced, the amount of the combustible gas generated by the dry distillation is also reduced, and the combustion temperature $T_2$ of the combustible gas in the combustion furnace 3 drops. For promoting the partial burning of the waste material A in the gasification furnace 1, the valve controller 15 associated with the gasification furnace 1 gradually increases the opening of the control valve 13 continuously as shown in FIG. 3, increasing the amount of oxygen supplied to the gasification furnace 1 thereby to promote the dry distillation of the waste material A in the gasification furnace 1 so as to keep the combustion temperature $T_2$ of the combustible gas in the combustion furnace 3 at the substantially constant temperature $T_{2b}$. Finally, the opening of the control valve 13 is maximized, and the amount of oxygen supplied to the gasification furnace 1 is maximized. When the amount of waste material A which can be thermally decomposed through dry distillation becomes only slight and then nil, it is no longer possible to generate an amount of combustible gas large enough to keep the combustion temperature of the combustible gas in the combustion furnace 3 at the substantially constant temperature $T_{2b}$. Therefore, the amount of combustible gas introduced into the combustion furnace 3 is reduced, and the combustion temperature $T_2$ thereof is lowered as indicated by the solid-line curve $a_1$ in FIG. 2.

Upon a decrease in the combustion temperature $T_2$ of the combustible gas in the combustion furnace 3, the red-hot layer "b" which occupies the portion of the waste material A except for the ashing layer "a" in the gasification furnace 1 increases in extent, and the amount of heat of combustion which is absorbed by the dry distillation of the waste material A is reduced. Therefore, the temperature $T_1$ in the gasification furnace 1 sharply increases and then falls as the burning and ashing of the waste material A progresses, as indicated by the solid-line curve b in FIG. 2.

In a stage at which the final ashing of the waste material A progresses, it is necessary to completely burn and hence reliably ash the waste material A. According to the present invention, at the time the combustion temperature $T_2$ in the combustion furnace 3 drops after having been kept at the substantially constant temperature $T_{2b}$, the valve controller 17 associated with the gasification furnace 1 controls the valve actuator 18 to fully open the shutoff valve 14 in the auxiliary oxygen supply pipe 10 to supply oxygen from the oxygen supply source 11 through the auxiliary oxygen supply pipe 10 to the gasification furnace 1 when the combustion temperature $T_2$ in the combustion furnace 3 detected by the temperature sensor 45 of the combustion furnace 3 and the temperature $T_1$ in the gasification furnace 1 detected by the temperature sensor 29 of the gasification furnace 1 rises beyond a preset temperature $T_{1a}$. (see FIG. 2) which is determined as representing an ending stage of the dry distillation of the waste material A, at a time $t_3$ in FIG. 2.

The gasification furnace 1 is now supplied with an increased amount of oxygen from the oxygen supply source 11 through the main oxygen supply pipe 9 and the auxiliary oxygen supply pipe 10, so that the final burning and ashing of the waste material A in the gasification furnace 1 is promoted thereby to fully ash the waste material A.

When the combustion temperature $T_2$ of the combustible gas in the combustion furnace 3 drops, the combustible gas is incapable of spontaneous combustion, and hence the igniter 43 of the combustion furnace 3 is operated again by the ignition controller 43a depending on the reduction of the combustion temperature $T_2$ for thereby combust the combustible gas.

As the opening of the control valve 13 associated with the gasification furnace 1 gradually increases at the ending stage of the dry distillation, the valve controller 15 which controls the control valve 13 associated with the gasification furnace 1 recognizes and monitors the opening of the control valve 13 based on the extent to which the valve actuator 16 is operated. When the opening of the control valve 13 increases up to a predetermined opening $K_0$ at a time $t_r$ shown in FIG. 3, the valve controller 15 starts a timer (not shown) thereof, and continuously monitors the opening of the control valve 13 to determine whether the opening thereof remains greater than the predetermined opening $K_0$ during a period of time preset by the timer. If the opening of the control valve 13 remains greater than the predetermined opening $K_0$ during the period of time preset by the timer, then the valve controller 15 outputs a start command signal to the ignition controller 19a of the igniter 19 of the gasification furnace 2 and the valve controller 15 associated with the gasification furnace 2 upon elapse of the period of time preset by the timer at a time $t_5$ shown in FIGS. 2 and 3.

In response to the start command signal, the igniter 19 of the gasification furnace 2 ignites a waste material A stored in the gasification furnace 2 in exactly the same manner as with the gasification furnace 1, and the valve controller 15 associated with the gasification furnace 2 controls the corresponding control valve 13 to start supplying oxygen to the gasification furnace 2. The waste material A in the gasification furnace 2 now begins to be burned in its lower layer and thermally decomposed through dry distillation in its upper layer in exactly the same manner as with the gasification furnace 1. A combustible gas generated by the dry distillation of the waste material A in the gasification furnace 1 is introduced into the combustion furnace 4 in which it is combusted, and the heat of combustion is imparted to the heat source X of the boiler B. Subsequently, the gasification furnace 2 and the combustion furnace 4 operate in exactly the same manner as with the gasification furnace 1 and the combustion furnace 3. Therefore, the combustion temperature $T_2$ in the combustion furnace 4 and the temperature $T_1$ in the gasification furnace 2 vary as indicated by the broken lines $a_2$, $b_2$, respectively, in FIG. 2.

The period of time spent after the opening of the control valve 13 increases beyond the predetermined opening $K_0$ until the combustion temperature $T_2$ of the combustible gas in the combustion furnace 2 starts to drop is substantially constant regardless of the manner in which the waste material A is stored in the gasification furnace 1. The period of time required after the gasification furnace 2 and the combustion furnace 4 have started to operate until the combustion temperature $T_2$ of the combustible gas in the combustion furnace 4 increases up to the substantially constant combustion temperature $T_{2b}$ is also substantially constant regardless of the manner in which the waste material A is stored in the gasification furnace 1. The period of time present by the timer is short compared with the period of time required until the combustion temperature $T_2$ of the combustible gas in the combustion furnace 4 increases up to the substantially constant combustion temperature $T_{2b}$. The predetermined opening $K_0$ for the control valve 13 associated with the gasification furnace 1 is established such that the period of time spent after the opening of the control valve 13 associated with the gasification furnace 1 has increased beyond the predetermined opening $K_0$ until the combustion temperature $T_2$ of the combustible gas in the combustion furnace 3 starts to drop is substantially the same as the period of time required after the gasification furnace 2 and the combustion furnace 4 have started to operate until the combustion temperature $T_2$ of the combustible gas in the combustion furnace 4 increases up to the substantially constant combustion temperature $T_{2b}$.

Consequently, the combustion temperature $T_2$ in the combustion furnace 4 rises to the substantially constant combustion temperature $T_{2b}$ when the temperature $T_2$ of the combustible gas in the combustion furnace 3 that has previously been operated starts to drop from the substantially constant combustion temperature $T_{2b}$, and thereafter is maintained at the substantially constant combustion temperature $T_{2b}$.

Therefore, the heat of combustion at the substantially constant combustion temperature $T_{2b}$ is imparted from the combustion furnaces 3, 4 to the heat source X of the boiler B continuously upon a shift of operation from the combination of the gasification and combustion furnaces 1, 3 to the combination of the gasification and combustion furnaces 2, 4. The quantity of heat of combustion per unit time is maintained at a uniform level upon a shift of operation from the combination of the gasification and combustion furnaces 1, 3 to the combination of the gasification and combustion furnaces 2, 4. The boiler B can therefore efficiently and stably operate continuously upon a shift of operation from the combination of the gasification and combustion furnaces 1, 3 to the combination of the gasification and combustion furnaces 2, 4.

After the operation of the gasification and combustion furnaces 1, 3 is finished, and while the waste material A is thermally decomposed through dry distillation in the gasification furnace 2, an ashed material in the gasification furnace 1 is discharged from an ash outlet in a lower portion thereof, and a waste material A is newly stored in the gasification furnace 1. Then, in the same manner as described above, when the opening of the control valve 13 associated with the gasification furnace 2 remains greater than the predetermined opening $K_0$ continuously for the period of time preset by the timer, the valve controller 15 associated with the gasification furnace 2 outputs a start command signal to the igniter 19 and the valve controller 15 which are associated with the gasification furnace 1. The operation of the gasification and combustion furnaces 2, 4 is thus followed by the processing of the waste material A with the gasification and combustion furnaces 1, 3. Also in this case, when the combustion temperature $T_2$ of the combustible gas in the combustion furnace 4 starts to drop, the combustion temperature $T_2$ of the combustible gas in the combustion furnace 2 increases up to the combustion temperature $T_{2b}$, as indicated by the solid-line curves $a_3$, $b_3$ in FIG. 2. Subsequently, the process of operation of the gasification and combustion furnaces 1, 3 and the process of operation of the gasification and combustion furnaces 2, 4 are alternately repeated.

Therefore, the boiler B can operate efficiently and stably over a long period of time. Furthermore, a large amount of waste material A can be incinerated by the combination of the gasification and combustion furnaces 1, 3 and the combination of the gasification and combustion furnaces 2, 4.

The opening of the control valve 13 associated with the gasification furnace 1 may possibly become greater than the predetermined opening $K_0$ temporarily sometime during the dry distillation of the waste material A depending on the manner in which the waste material A is stored in the gasification furnace 1. Since, however, the gasification furnace 2 starts operating after the opening of the control valve 13 associated with the gasification furnace 1 has remained greater than the predetermined opening $K_0$ continuously over the period of time preset by the timer, the gasification furnace 2 does not start operating too early, and hence the combustion temperature $T_2$ of the combustible gas in the combustion furnace 4 increases up to the combustion temperature $T_{2b}$ when the combustion temperature $T_2$ of the combustible gas in the combustion furnace 3 starts to fall from the substantially constant combustion temperature $T_{2b}$.

Accordingly, the boiler B is allowed to operate reliably stably over a long period of time.

While the two sets or combinations of gasification and combustion furnaces 1, 3 and gasification and combustion furnaces 2, 4 are used to incinerate waste materials A in the illustrated embodiment, it is possible to successively operate more sets or combinations of gasification and combustion furnaces.

Although a certain preferred embodiment of the present invention has been shown and described in detail, it should be understood that various changes and modifications may be made therein without departing from the scope of the appended claims.

What is claimed is:

1. A method of incinerating a waste material through dry distillation and gasification, comprising the steps of:
   (a) thermally decomposing a waste material stored in a first gasification furnace through dry distillation;
   (b) introducing a combustible gas produced in the first gasification furnace by the dry distillation into a first combustion furnace, combusting the combustible gas in the first combustion furnace, and imparting the heat of combustion to a heat source of an object to be heated;
   (c) controlling the opening of a valve disposed in an oxygen supply passage connected to the first gasification furnace to supply an amount of oxygen required to thermally decompose the waste material in the first gasification furnace through dry distillation in order to keep the combustion temperature of the combustible gas in the first combustion furnace at a substantially constant combustion temperature upon the dry distillation of the waste material in the first gasification furnace;

(d) starting to thermally decompose a waste material stored in a second gasification furnace through dry distillation when the opening of the valve disposed in the oxygen supply passage connected to the first gasification furnace increases and becomes greater than a predetermined opening at an ending stage of the dry distillation of the waste material in the first gasification furnace;

(e) introducing a combustible gas produced in the second gasification furnace by the dry distillation into a second combustion furnace, combusting the combustible gas in the second combustion furnace, and imparting the heat of combustion to the heat source of the object to be heated; and (f) controlling the opening of a valve disposed in an oxygen supply passage connected to the second gasification furnace to supply an amount of oxygen required to thermally decompose the waste material in the second gasification furnace through dry distillation in order to keep the combustion temperature of the combustible gas in the second combustion furnace at said substantially constant combustion temperature upon the dry distillation of the waste material in the second gasification furnace.

2. A method according to claim 1, wherein each of said steps (a) and (d) comprises the steps of igniting and burning a portion of the waste material, and thermally decomposing the remainder of the waste material with the heat of combustion of the portion of the waste material.

3. A method according to claim 1, wherein each of said steps (c) and (f) comprises the steps of reducing the opening of said valve when the combustion temperature of the combustible gas in the combustion furnace is higher than a given temperature preset as said substantially constant combustion temperature, and increasing the opening of said valve when the combustion temperature of the combustible gas in the combustion furnace is lower than said given temperature.

4. A method according to claim 1, wherein each of said steps (b) and (e) comprises the step of mixing the combustible gas introduced from the gasification furnace into the combustion furnace with oxygen required to combust the combustible gas to combust the combustible gas in the combustion furnace.

5. A method according to claim 1, wherein said opening of the valve disposed in the oxygen supply passage connected to the first gasification furnace at the time of starting to thermally decompose the waste material stored in the second gasification furnace through dry distillation in said step (d) is determined such that a period of time spent after the opening of the valve disposed in the oxygen supply passage connected to the first gasification furnace has increased to said predetermined opening until the combustion temperature of the combustible gas in the first combustion furnace starts to drop from said substantially constant combustion temperature is substantially equal to a period of time spent after the dry distillation of the waste material stored in the second gasification furnace has been started until the combustion temperature of the combustible gas in the second combustion furnace increases to said substantially constant combustion temperature.

6. A method according to claim 1, further comprising the steps of removing the waste material ashed in the first gasification furnace and newly storing a waste material in the first gasification furnace upon the dry distillation of the waste material in the second gasification furnace, starting to thermally decompose the waste material newly stored in the first gasification furnace through dry distillation when the opening of the valve disposed in the oxygen supply passage connected to the second gasification furnace increases and becomes greater than a predetermined opening at an ending stage of the dry distillation of the waste material in the second gasification furnace, and alternately repeating the dry distillation of the waste materials in the first and second gasification furnaces.

7. A method according to claim 1, wherein when the opening of the valve disposed in the oxygen supply passage connected to one of the first and second gasification furnaces in which the waste material is thermally decomposed through dry distillation is greater than said predetermined opening continuously for a predetermined period of time, the waste material stored in the other of the first and second gasification furnaces starts being thermally decomposed through dry distillation.

8. A method according to claim 1, wherein said object to be heated comprises a boiler.

* * * * *